United States Patent
Wang et al.

(10) Patent No.: US 8,918,726 B2
(45) Date of Patent: Dec. 23, 2014

(54) METHOD AND APPARATUS FOR IMPLEMENTING SHARED EDITING OF DOCUMENT

(75) Inventors: Donglin Wang, Beijing (CN); Yuewen Hou, Beijing (CN)

(73) Assignee: Tianjin Sursen Investment Co., Ltd., Tianjin (CN)

( * ) Notice: Subject to any disclaimer, the term of this patent is extended or adjusted under 35 U.S.C. 154(b) by 555 days.

(21) Appl. No.: 12/623,543

(22) Filed: Nov. 23, 2009

(65) Prior Publication Data

US 2010/0070882 A1    Mar. 18, 2010

Related U.S. Application Data

(63) Continuation of application No. PCT/CN2008/071132, filed on May 29, 2008.

(30) Foreign Application Priority Data

May 29, 2007    (CN) .......................... 2007 1 0099733

(51) Int. Cl.
G06F 3/01     (2006.01)
G06Q 10/10    (2012.01)
G06F 17/24    (2006.01)

(52) U.S. Cl.
CPC .... *G06F 17/24* (2013.01); *G06F 3/01* (2013.01); *G06Q 10/10* (2013.01)
USPC ............................ 715/753; 715/530; 707/201

(58) Field of Classification Search
USPC .......................................... 715/530; 707/201
See application file for complete search history.

(56) References Cited

U.S. PATENT DOCUMENTS

| | | | | |
|---|---|---|---|---|
| 6,342,906 B1* | 1/2002 | Kumar et al. | ................. | 715/751 |
| 8,239,760 B2* | 8/2012 | Hanson et al. | ................. | 715/255 |
| 8,566,729 B2* | 10/2013 | Komine et al. | ............... | 715/751 |
| 2003/0165271 A1* | 9/2003 | Boon | ............................ | 382/238 |
| 2006/0259524 A1* | 11/2006 | Horton | ......................... | 707/201 |
| 2007/0053596 A1* | 3/2007 | Yokose | ......................... | 382/239 |
| 2007/0118598 A1 | 5/2007 | Bedi et al. | ..................... | 709/204 |
| 2007/0186157 A1* | 8/2007 | Walker et al. | ................ | 715/530 |
| 2007/0198534 A1* | 8/2007 | Hon et al. | ........................ | 707/10 |

FOREIGN PATENT DOCUMENTS

| | | | | |
|---|---|---|---|---|
| CN | 1787443 | 6/2006 | ............. | H04L 12/16 |
| CN | 1773496 | 5/2007 | ............. | G06F 17/30 |
| CN | 1979466 | 6/2007 | ............. | G06Q 10/00 |

OTHER PUBLICATIONS

Lin, et al., "CCDES—a collaborative compound document editing system", Computer Communications 19 (1996) 590-596.

* cited by examiner

*Primary Examiner* — Phenuel Salomon
*Assistant Examiner* — Tuan S Nguyen
(74) *Attorney, Agent, or Firm* — Duane Morris LLP

(57) ABSTRACT

The present invention provides a method for implementing shared editing of a document, including: dividing a document into multiple portions; when a user modifies the document, providing at least one portion of the multiple portions for the user to modify, wherein the at least one portion is prohibited to be modified by another user at the same time; and storing the modified by the user. Therefore, multiple users may edit a same document simultaneously by utilizing a docbase management system, and the modifications made by each user to the document can be stored wholly. Moreover, because the document is managed by one party, the security of the document can be guaranteed.

18 Claims, 2 Drawing Sheets

METHOD AND APPARATUS FOR IMPLEMENTING SHARED EDITING OF DOCUMENT

This application is a Continuation of PCT/CN2008/071132 filed May 29, 2008, which claims the benefit of CN 200710099733.5 filed May 29, 2007, both of which applications are fully incorporated herein by reference.

CROSS-REFERENCE TO RELATED APPLICATIONS

This application claims the benefit of PCT/CN2008/071132 filed May 29, 2008, which is the PCT filing of CN 200710099733.5 filed May 29, 2007, both of which applications are fully incorporated herein by reference.

FIELD OF THE INVENTION

The present invention relates to the field of interoperation of electronic documents, and particularly, to a method and apparatus for implementing shared editing of a document.

BACKGROUND OF THE INVENTION

In practice, there is often happened that multiple users need to perform shared editing of an electronic document. Currently, the shared editing of a document in a docbase management system is generally implemented as follows: the document to be shared and edited is transferred between the system and the multiple users through an e-mail system or an office automation system, and after one user finishes editing the document, the document is sent to another user to be edited.

The above solution for shared editing of a document has a few deficiencies: 1) multiple users can not edit the same document simultaneously, but having to edit the document one by one just as in a relay race, which lowers the efficiency of document editing and brings troubles such as missing contents or distorted contents of a document during the transfer of the document; 2) multiple copies of the document are generated during the transfer of the document, which brings troubles for centralized management of documents; when the security level of the document is high and the document is forbidden to be copied, the shared editing of the document between multiple users can not be implemented.

Currently, in some document storage systems, multiple user terminals can open and browse the same document simultaneously, where one user terminal does not know modifications to the document made by another user terminal accessing the same document, thus confliction and chaos will arise when all of the multiple user terminals modify the same document, and the security of the document is impaired greatly.

It can be seen that there is still no good solution for implementing shared editing of a document by multiple users.

SUMMARY OF THE INVENTION

The present invention provides a method and an apparatus for implementing shared editing of a document so as to implement shared editing of multiple users on a document.

To attain the above objective, the technical solutions of the present invention are as follows.

A method for implementing shared editing of a document includes: dividing a document into portions; when a user modifies the document, providing at least one portion of the portions for the user to modify, wherein the at least one portion is prohibited to be modified by another user at the same time; and storing the portion modified by the user.

An apparatus for implementing shared editing of a document includes:
a first module, adapted to provide at least one portion of a document for a user to modify when the user modifies the document, wherein the document comprises at least two portions, and the at least one portion is prohibited to be modified by another user at the same time;
a second module, adapted to store the portion modified by the user.

An apparatus for implementing the shared editing of a document includes:
a first module, adapted to present at least one portion of a document provided by a docbase management system to a user; and
a second module, adapted to store modifications made by the user to the at least one portion into the docbase management system.

It can be seen from the above technical solutions that according to the present invention, through unified management of a document, dividing and storing the document according to portions, the user can select and edit a certain layer of a page in the document when needing to edit the document. Specifically, the shared editing of the document is implemented by making different users edit different layers. In this way, multiple users can edit the same document simultaneously, and the modifications made by each user to the document can be stored wholly. Moreover, because the document is managed centralized, the security of the document can be guaranteed effectively.

DETAILED DESCRIPTION OF THE INVENTION

The present invention will be illustrated in detail hereinafter with reference to the accompanying drawings to make the objective, solution and merits thereof more obvious.

In the present invention, the basic idea for implementing shared editing of a document includes: managing the document by one party, storing the document according to pages and layers, and taking layer as the unit for editing when the document is edited. Specifically, when a same page of the document is edited by different users, different layers including the page are selected for the different users to edit so as to avoid confliction resulted from different users editing the same document.

An embodiment of the present invention adopts a docbase management system. The docbase management system is a complicated software system, which provides functions such as organizing, managing, securing, storing and displaying of mass amount of documents. In the description of a base patent application submitted earlier by the applicant, whose application number is CN200510131072.0, a document processing system including a docbase management system, a storage device and an application software is provided. Data of the docbase management system is stored in the storage device, and the docbase management system is connected with the application software via a standard invoking interface. The standard invoking interface is defined based on predefined actions and objects. Operations performed by the application software on a document are converted into operations performed on an abstract model such as a predefined universal document model, where the application software sends an instruction to the docbase management system through the standard invoking interface, and the docbase management system performs an operation on the document stored in the storage device according to the instruction of the application software. The universal document model may include multiple levels such as document sets, documents, pages, layers, object groups and layout objects, and so on.

Figure 1:
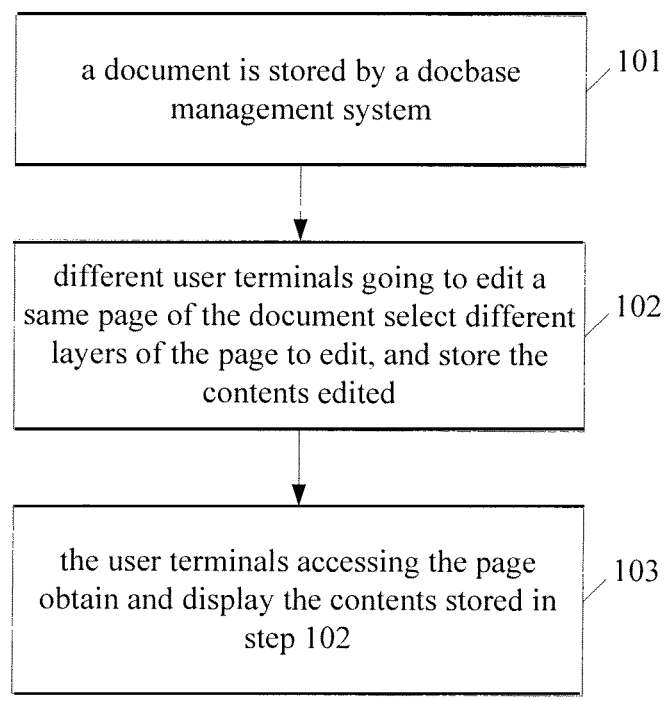
FIG. 1 is a flowchart illustrating a general method for implementing shared editing of a document according to an embodiment of the present invention.

FIG. 1 is a flowchart illustrating a general method for implementing shared editing of a document according to an embodiment of the present invention. As shown in FIG. 1, the method includes steps as follows.

In step 101, a document is stored by a docbase management system.

In step 102, different user terminals going to edit a same page of the document select different layers of the page to edit, and store the contents edited.

In step 103, the user terminals accessing the page obtain and display the contents stored in step 102.

The above is a general description of the method for implementing shared editing of a document according to an embodiment of the present invention.

A docbase management system for implementing shared editing of a document according to an embodiment of the present invention includes:

a first module, adapted to provide at least one portion of a document for a user to modify when the user modifies the document. The document includes at least two portions and each portion is prohibited to be provided simultaneously for different users to modify;

a second module, adapted to store contents of the document according to contents of the portion modified by the user.

The docbase management system may further include a third module, adapted to perform one or more of the following processes:

after the second module stores the contents of the document according to contents of the portion modified by the user, providing contents of the modified portion to another user accessing the modified portion;

when another user queries information of the document, determining whether the queried portion includes the modified portion; if yes, providing the modified portion for the another user;

after the second module stores the contents of the document according to contents of the portion modified by the user, notifying other users accessing the modified portion.

A user terminal apparatus for implementing shared editing of a document according to an embodiment of the present invention includes:

a first module, adapted to present at least one portion of a document provided by a docbase management system to a user;

a second module, adapted to provide modified contents of the at least one portion modified by the user for the docbase management system to store;

a third module, adapted to send a query request for obtaining a modifying status of the document to the docbase management system, wherein the query request includes information of at least one portion of the document, receive an updating notification from the docbase management system, and provide contents of the portion updated for the first module for presenting.

Figure 2:
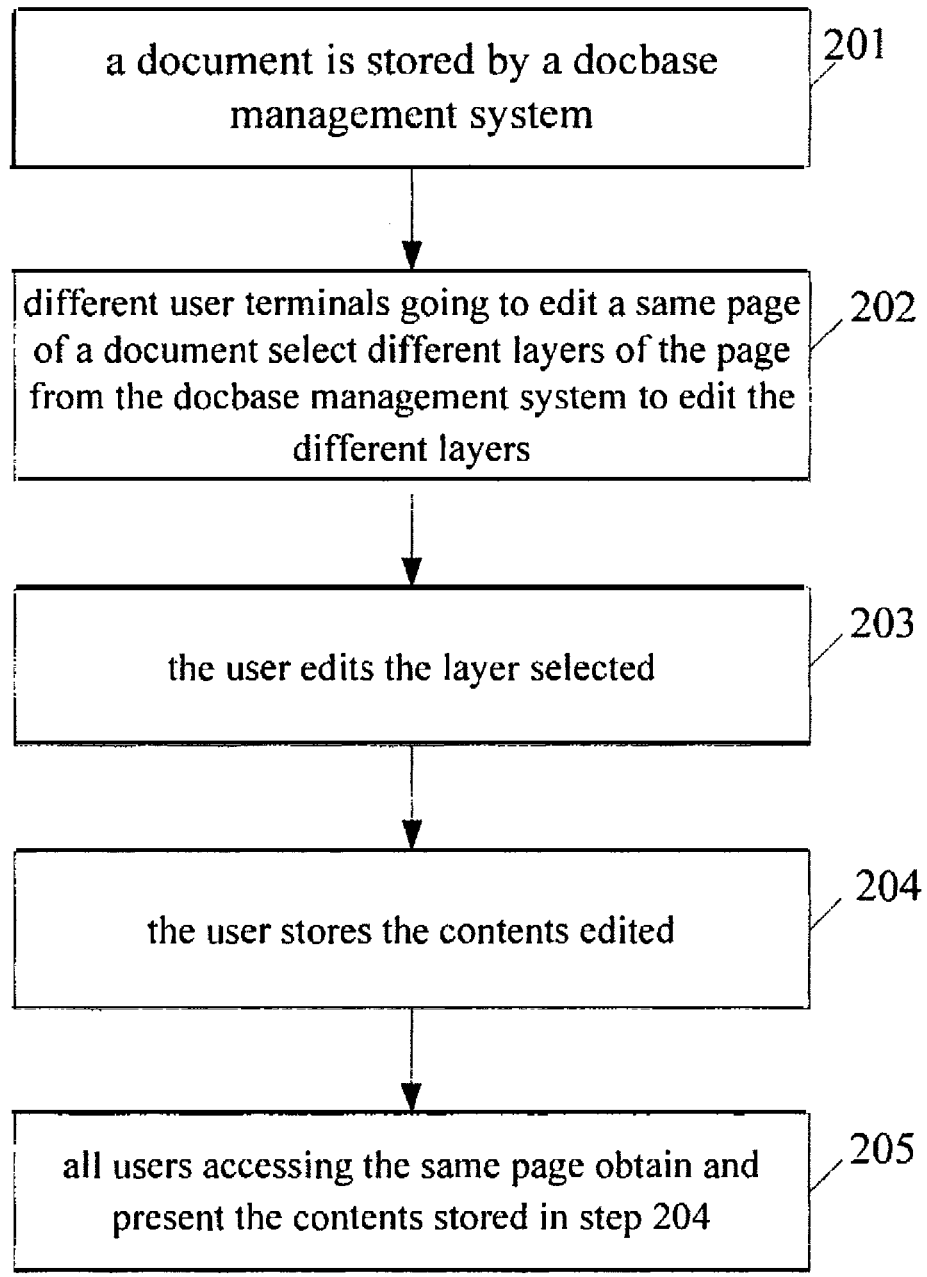
FIG. 2 is a flowchart illustrating a detailed method for implementing shared editing of a document according to an embodiment of the present invention.

Details of the method will be described by referring to embodiments of the present invention. FIG. 2 is a flowchart illustrating a detailed method for implementing shared editing of a document according to an embodiment of the present invention. As shown in FIG. 2, the method includes steps as follows.

In step 201, a document is stored by a docbase management system.

In this step, the docbase management system may divide and store the document according to pages and layers, where each layer includes layer data and layer attributes.

The dividing and storing the document according to pages and layers may include: dividing data of the document into groups, each group of data is taken as a layer, each layer is stored in sequence, and one layer is overlaid with another layer like one piece of glass over another piece of glass. The grouping of the data of the document may adopt any manner. For example, the whole document can be a group, one section of the document can be a group, one page of the document can be a group, or one paragraph in one page of the document can be a group. The docbase management system manages and controls each layer respectively. For facilitating management of each layer of the document, a layer may include layer data and layer attributes. The layer data includes texts, graphic elements and images as well as attribute data thereof; the layer attributes include a layer identifier, a display sequence, transparency, a data abstract of the layer, the user currently editing the layer and the start time of the editing, and so on. The data abstract of the layer is a specific character string representing the data contents of the layer, and is obtained by processing the data of the layer utilizing a certain algorithm. By processing the data of the layer utilizing the algorithm, the character string obtained is different if the data of the layer is different. Thus the data abstract of the layer can be utilized for simplifying comparison between two groups of mass amount of data. The algorithm may be MD5.

When the document is divided and stored according to pages and layers, the manner adopted for dividing each page is independent with that of other pages. For example, the first page may be divided into two layers, and the second page may be divided into three layers, and so on. When multiple pages of the document are taken as a layer, the number of pages in one layer may be different from that in other layers. For example, the first layer may include two pages, and the second layer may include four pages, and so on. When a new document is added to the docbase management system, the docbase management system usually initiates the new document with only one layer.

An example in which it is supposed that user A accesses a certain document in the docbase management system through a user terminal for editing will be illustrated in the following, where a document is divided into layers based on page. It should be noted that other manners for dividing a document into layers, e.g., one layer includes more than one page, can be deduced based on the same principle as that of the example, and will not be described with reference to examples. A user terminal may include an editing software with editing functions. In the following descriptions, operations performed by the user A through the user terminal are also referred to as operations performed by the user A.

In step 202, different user terminals going to edit a same page of a document select different layers of the page from the docbase management system and edit the different layers.

In this step, the selecting a layer of the page by a user may include: the docbase management system allocates a layer other than layers allocated to other users to the user; or the user establishes a new layer; or the user initiatively selects a layer of the page which is existing in the docbase management system and is allowed to be edited.

When the docbase management system allocates a layer other than layers allocated to other users to the user, the docbase management system may adopt a predetermined policy, e.g. the docbase management system may record the layer corresponding to each user, and always allocates the same layer to the same user, where the docbase management system may establish a relation between a layer and characteristics of a user, the characteristics of the user may be a user name or other identifications; or the docbase management system randomly allocates a layer to the user based on the utilizing status of each layer.

When the user initiatively selects a layer of the page, the docbase management system has to record the allocation status and utilizing status of each layer in advance. When a certain layer is being edited by a user, the docbase management system locks the layer, e.g. sets the status of the layer to be a locking status, and forbids other users to edit the layer. When selecting a layer of the page, the user terminal can recognize which layers are allowed to be edited (e.g., the docbase management system can present to the user terminal the layers which are allowed to be edited, or present information indicating whether a layer is allowed to be edited to the user terminal), the user terminal selects a layer from the layers which are allowed to be edited and edits the selected layer, so as to guarantee that different user terminals edit different layers.

When a user terminal selects a layer, any one of the above three manners can be adopted according to practical situations.

In step 203, the user edits the layer selected.

In this step, user A may add a text, a graphic element and image data into the layer through the user terminal, and set attributes of the objects, e.g. set the font, text size and text color and set the graphic element as a line, a rectangle or an ellipse, and so on.

In step 204, the user stores the contents edited.

In this step, storing the contents edited may include: storing the contents whenever the user issues a request, and/or storing the contents when a predefined storing condition is satisfied.

When the contents are stored when a predefined storing condition is satisfied, the storing condition may be pre-set; when the storing condition is satisfied, the contents edited are stored automatically. The predefined storing condition may include: a time interval, which may be a fixed time interval or a time interval adjusted adaptively according to situations. For example, the predefined storing condition may be that the contents are stored once every 2 minutes; after the contents are stored for n times, it is detected that the contents of the layer are modified every time when stored, and thus the time interval can be shortened to 1 minute; then after the contents are stored for n times, it is detected that the contents of the layer are not modified every time when stored, and the time interval can be increased to 1.5 minute. In this way, the time interval can be adjusted dynamically according to real-time situations. The predefined storing condition may also include: when it is detected that the contents of the layer are changed, the contents of the layer will be stored; or when it is detected that the amount of modifications to the contents of the layer reaches a designated amount, e.g., the modifications to one line is accomplished and etc., the contents of the layer will be stored.

In order to make other users learn about the modifications made by the user to the layer, the embodiment may also include the following steps.

In step 205, all users accessing the same page obtain and present the contents stored in step 204. The users may choose to present all layers of the page, or to present one layer or several layers of the page.

The obtaining contents stored in step 204 by all the users accessing the same page may adopt an initiative notification manner or a periodical query manner.

The initiative notification manner includes: after the edited contents of a layer of the page are stored in step 204, the docbase management system sends a notification message to all users accessing the same document with user A, and notifies the users that a layer B of page M in the document has changed. If a certain user is browsing the page M, the user terminal may obtain the data of the layer B and present the layer B according to the display sequence attribute and transparency attribute of the layer B, and thus the user can see the modifications to the layer B made by user A.

The docbase management system may adopt two manners for sending a notification message, i.e. a broadcasting manner and a targeted sending manner.

In the broadcasting manner, the docbase management system broadcasts to all user terminals a message indicating that the contents of a document has changed, where the message contains identification information of the page and layer whose contents are changed. After receiving the message, a user terminal may determine whether the page and layer accessed by itself are changed; if yes, the user terminal updates the page and layer according to the contents in the docbase management system; otherwise, the user terminal discards the message or do not process the message.

In the targeted sending manner, the docbase management system records the page and layer of a document accessed by each user terminal; the docbase management system sends the message indicating the contents of the document are changed to all user terminals accessing contents related to the changed contents (e.g. accessing the same page); the user terminals receiving the message update the contents accessed according to the contents in the docbase management system. In the above process, the docbase management system may adopt an explicit manner or an implicit manner for recording the page and layer accessed by each user terminal. In the explicit manner, when opening one layer of a certain page, the user terminal may send a message to the docbase management system, and the docbase management system records the layer of the page opened by the user terminal; when closing the layer of the page, the user terminal may also send a message to the docbase management system, and the docbase management system records the layer of the page closed by the user terminal. In the implicit manner, when the user terminal opens one layer of a page, the docbase management system automatically records the layer of the page opened by the user terminal; when the user terminal opens another layer or a layer of another page, the docbase management system automatically records the page or the layer newly opened by the user terminal and that the layer of the page opened earlier is closed. For example, when user A opens page M, the docbase management system records that the page currently opened by the user A is M; when the user A opens page M+1, the docbase management system records that the page currently opened by the user A is M+1 and that the page M is closed.

The periodical query manner may include: a user terminal queries the docbase management system at a predefined time interval, and determines whether the contents of each layer of the page opened by the user terminal are changed; if the contents of each layer of the page are changed, the user terminal obtains and presents the contents edited in step 204; otherwise, the process will be terminated. The query process can be implemented in multiple ways, of which two examples will be described as follows. In the first example, a user may send a request to the docbase management system through a user terminal for requesting the docbase management system to return information indicating whether each layer of a page is changed; after receiving the request, the docbase management system compares the identifier of the page and the information of each layer currently accessed by the user terminal in the request, e.g. time of last storing and the data abstract of the layer and so on, with the information of the layer stored in the docbase management system, judges whether the contents of each layer of the page are changed, and sends a judge result to the user terminal. In the second example, the user sends a request to the docbase management system through the user terminal for obtaining information of each layer of the page, e.g. requests the docbase management system to return the data abstract of the layer stored last time or the time when the layer is last stored; after receiving the request, the docbase management system sends the information of each layer to the user terminal; the user terminal compares the information of each layer currently used by the user terminal with the information sent by the docbase management system, judges whether the contents of each layer of the page are changed. When the contents of a layer of the page are changed, multiple manners can be adopted for updating the data of the layer of the page currently used by the user terminal. For example, when determining that the contents of a layer of the page are changed, the docbase management system may send the data of the changed layer directly, or notify the user terminal of the information of the changed layer, and the user terminal sends a request for obtaining the data of the changed layer to the docbase management system.

The predefined time interval may be a fixed time interval or a time interval updated according to real-time situations. The updating of the time interval is the same with that in step 204, and will not be described again.

When the docbase management system stores the modifications made by the user terminal to a layer, other user terminals accessing the same page can obtain the contents of the modifications and update the document currently accessed, so that all users accessing the same document could learn about the modifications to the contents of the document. Other user terminals accessing the same page may select to view contents of only one layer or several layers, and thus the user may view the modifications made by other users to each layer.

The determining whether the contents of a layer of a page accessed by the user terminal are changed may include: the user terminal determines whether the data of the current layer is identical with the data of the layer stored in the docbase management system, or determines whether the storing time of the current layer is identical with the storing time recorded in the docbase management system; when identical, it is determined that the contents of the layer are not changed; otherwise, it is determined that the contents of the layer are changed.

Preferably, the user terminal may determine whether the data of the current layer is identical with the data of the layer stored in the docbase management system based on the data abstract of the layer in the layer attributes mentioned in step 201, which reduces the time needed for the comparison.

After obtaining the contents stored in step 204 according to any of the above manners, the user terminal may present the contents, which may include: displaying the edited contents of the layer according to the display sequence and the transparency which are edited.

Thus, the method for implementing shared editing of a document according to the embodiment of the present invention is completed. The following description takes a specific example for illustrating the various operations performed in the embodiment of the present invention.

Suppose there is a docbase DocbaseA which can be established as a UOML conformed docbase management system. DocbaseA has a DocumentA. Two users, UserA and UserB, are accessing and editing the DocumentA through respective user terminals.

UserA opens page M of the document, and the page M is divided into multiple layers, and the number of the layers is LayerMNum. By checking the contents and attributes of each layer, UserA may determine to modify a certain layer which is allowed to be edited; or the docbase management system allocates to the user a layer which is allowed to be edited and is different from layers allocated to other users; or UserA creates a new layer for editing. Suppose UserA selects to edit layer LayerMIndex of page M, then UserB is prohibited to select layer LayerMIndex of page M when selecting a layer for editing; instead, UserB has to select another layer of page M to edit or create a new layer to edit, or the docbase management system allocates another layer to UserB.

The UserA may add a text, a graphic element and image data to the layer by utilizing editing functions provided by the user terminal, and set attributes of the objects, e.g. set the font, text size and color for the text, and set the graphic element as a line, a rectangle or an ellipse, and so on. When determining that the user has completed editing one object, the user terminal may store the object automatically; the user may also store the object manually at any time; or the object may be stored at a certain time interval automatically. Suppose UserA adds a text object TextObj. When storing the TextObj, the user terminal may add the TextObj to the layer LayerMIndex directly. After the TextObj is stored, the user and time of last storing the layer LayerMIndex and the data abstract of the layer in the DocbaseA are updated, and the above data in the user terminal is also updated. When determining that UserA completes editing the layer, the user terminal notifies the docbase management system to make the layer available for other users to edit.

When the contents of the document are stored in DocbaseA, DocbaseA may send to all user terminals a message that the contents of the document have changed, and the message may include the identifier of layer LayerMIndex of page M of DocumentA. UserB will receive the message. The user terminal of UserB determines whether the page opened by the user terminal is page M of DocumentA; if the page opened by the user terminal is page M of DocumentA, the user terminal obtains the data of layer LayerMIndex again, and determines how to draw the LayerMIndex layer based on the display sequence attribute LayerMIndexZOrder and the transparency attribute LayerMIndexOp of the layer LayerMIndex. In this way, UserB can also learn about the modifications made by UserA to the layer LayerMIndex.

Or, DocbaseA may send a message to all user terminals opening page M of DocumentA for notifying the user terminals that the layer LayerMIndex of page M of the DocumentA has changed. UserB will receive the message. If UserB are browsing page M, the user terminal draws the layer LayerMIndex according to the above mentioned method. In this way, UserB can learn about the modifications made by UserA to the layer LayerMIndex. The UserB may also edit and store a selected layer according to the above method. Similarly, UserA can also learn about the modifications made by UserB.

In the above example, UserA and UserB may also query the docbase management system periodically, and obtain the up-to-date data of page M, so as to update the contents being browsed by UserA and the UserB.

As can be seen from the above example, shared editing of DocumentA by multiple users can be implemented by UserA and UserB editing different layers. After UserA modifies the DocumentA, UserB can receive information in real time about UserA modifying the DocumentA, so as to guarantee the security and interoperation of the data contents of the document. Therefore, by adopting the method for implementing shared editing of a document provided by the present invention, multiple users may open a same document to edit, and it can be guaranteed that the modifications made by each user to the document can be stored wholly and all users can view the modifications made by each user to the document.

For facilitating exchanging edited contents among users, a method based on visual appearance may be employed in the present invention. Visual appearance information is extracted from contents which are edited by a user and then is stored, so that the visual appearance information can be provided for other users to use (e.g. edit, browse). By using this method, incompatibility of different data formats can be avoided. Even different users edit the document contents by employing different editing software respectively; the same visual appearance is presented at the different user terminals of the users. In another word, the same displaying effect is presented at the different user terminals. So, exchanging edited contents among users who employ different types of editing software respectively can be achieved. In an embodiment of the present invention, the method based on visual appearance is implemented by using a docbase management system. In detail, document data (which is normally layout document) of a docbase management system has mature capabilities of describing page layout, it is able to describe any visual appearance. Thus, regarding the content edited by a user, no matter what kind of document format (or storage form) is adopted when editing, it is feasible to extract visual appearance of the edited content and store the extracted visual appearance as document data of the docbase management system. Although the document data of the editing software and one of docbase management system may have different data format (or storage form), they have the same visual appearances (neglecting possible subtle difference generated during data conversion, which is too subtle to affect the application effect and often can not be detected by eyes). In this way, the formats of edited contents needn't be handled when the edited contents are stored and exchanged. Specifically, the editing software may store visual appearance information of the edited contents by issuing instructions to the docbase management system, and may obtain visual appearance information of a specific page of a document by issuing instructions to the docbase management system and present the visual appearance of the page to the user. Generally, an abstract model (e.g. a universal document model) which has mature abilities for describing page layout is adopted by the docbase management system, so a document with any visual appearances can be generated by issuing instructions to the docbase management system.

In an embodiment of the present invention, there is a server which stores document data. Contents edited by each user terminal will be submitted to the server for storage. Each user terminal also obtains data from the server for using. When further employing the above method based on visual appearance, the server may store visual appearance information of the edited contents, i.e. visual appearance information are extracted from the contents edited by the editing software and then are stored in the server. Then, when a user terminal queries some contents for using (eg. editing or browsing), the visual appearance information of the queried contents is obtained from the server and then provided for the user terminal. The extraction of the visual appearance information can be implemented by either the server or the user terminals.

According to another embodiment of the present invention, the user terminal uploads the document data generated by a docbase management system (usually a layout document or a part of layout document) to the server and store the document data in the server. Also, the user terminal obtains the document data from the server, and obtains the visual appearance information of the document data by invoking the docbase management system, at this time, the docbase management system may be run in the user terminal side. In another embodiment, the docbase management system (or a part of the docbase management system) is located at the server and the document data (and the visual appearance of the document data) is stored in the server centralizedly, so different user terminal can access the docbase management system at the same time. The docbase management system may be constituted by client/server mode, herein, the client part of the docbase management system is located at the user terminal side and the server part of the docbase management system is located at the server side. The editing software may be located at user terminal, or may be located at the server (e.g. web office), or may be constituted by client/server mode.

In an embodiment of the present invention, when providing at least one portion of a document for a user to modify, the method may further include: providing other portions of the document for a user to browse. Based on browsing the other portions, the user may modify the at least one portion better. For example, when a page of a document consists of several layers, the visual appearance of the page consists of the visual appearance of the layers, when a user expects to modify a layer, in order to assure the modifying effect, besides the layer which the user expects to modify, other layers which are consisted of the page also should be provided for the user to browse.

The foregoing description covers the preferred embodiments of the present invention and is not intended to limit the protective scope thereof. All the modifications, equivalent replacements, or improvements in the scope of the present invention's principles are included within the protective scope of the present invention.

The invention claimed is:

1. A method for implementing shared editing of a document, comprising: dividing a document stored by a docbase management system into layers, each layer is stored in sequence, and one layer is overlaid with another layer to form a page of the document; when a user modifies the document, the method comprising: providing, by the docbase management system, at least one layer of the layers for the user to modify, wherein the at least one layer is prohibited to be modified by another user at the same time; and wherein, providing, by the docbase management system, at least one layer of the layers for the user to modify comprises: providing visual appearance information of the at least one layer to editing software at user side and presenting the visual appearance of the at least one layer to the user via the editing software;

receiving and storing, by the docbase management system, visual appearance information of the layer modified by the user;

wherein the visual appearance is extracted from contents of the document, and describes page layout of the documents.

2. The method of claim 1, wherein the at least one layer comprises any or any combination of:

a layer, newly created by the user, of the document,
a layer pre-allocated to the user or user terminal of the user, and
a layer selected by the user from existing layers which are allowed to be modified in the document.

3. The method of claim 2, wherein the layer pre-allocated to the user comprises:
a layer corresponded to the user allocated to the user according to a corresponding relation between characteristics of the user and a layer of the document; or
a layer allocated to the user according to the order of issuing the request.

4. The method of claim 1, wherein the at least one layer provided for the user to modify is unlocked layer; the method further comprises:
locking, by the docbase management system, the at least one layer when the user modifies the at least one layer, and forbidding the locked layer to be modified by other users; and
unlocking, by the docbase management system, the locked layer when the user finishes modifying the locked layer.

5. The method of claim 1, wherein storing, by the docbase management system, the layer modified by the user comprises:
storing contents of the document corresponding to the at least one layer modified by the user when receiving a storing request from the user; and/or
storing contents of the document corresponding to the at least one layer modified by the user when a predefined storing condition is satisfied.

6. The method of claim 5, wherein the predefined storing condition comprises:
reaching a predefined time interval; and/or detecting that the contents of the at least one layer is changed; and/or detecting that the amount of the changed contents in the at least one layer reaches a designated amount.

7. The method of claim 1, further comprising:
providing, by the docbase management system, when a layer opened by the user is modified, the modified layer for the user.

8. The method of claim 7, wherein, providing, by the docbase management system, when a layer opened by the user is modified, the modified layer for the user comprises:
determining, when the user terminal of the user queries, whether the queried layer has been modified;
if yes, providing the modified layer for the user.

9. The method of claim 8, wherein the user terminal of the user queries comprises:
sending, by the user terminal of the user, a query request which includes information of a layer of the document;
determining whether the queried layer has been modified and providing the modified layer to the user comprises:
receiving the query request, determining whether the data and/or storing time and/or data abstract of the queried layer is identical with information of the layer stored; if the information of the queried layer is not identical with the information of the layer stored, determining the queried layer has been modified; and
sending the modified layer to the user.

10. The method of claim 7, wherein, providing, by the docbase management system, when a layer opened by the user is modified, the modified layer for the user comprises:
broadcasting, by the docbase management system, a message indicating the layer of the document is modified.

11. The method of claim 1, wherein, the document data is stored in a server, the at least one layer of the layers of the document is obtained from the server and then is provided for the user to modify; and the layer modified by the user is stored in the server.

12. The method of claim 1, wherein extracting and storing, by the docbase management system, visual appearance information of the layer modified by the user no matter what kind of document format is adopted by the editing software comprises:
receiving instructions, by the docbase management system, to generate document data that contains the visual appearance information.

13. The method of claim 12, wherein, whole or a part of the docbase management system is located in a server, the document data is stored in the server.

14. The method of claim 1, further comprising: providing, by the docbase management system, other layer of the document for the user to browse; wherein, the user modify the at least one layer based on browsing the other layer.

15. A docbase management system for implementing shared editing of a document, comprising a network computer including a processor coupled to a memory storing instructions for execution by the processor, and comprising:
a first module, while instructions are executed by the processor, adapted to provide at least one layer of a document for a user to modify when the user modifies the document, wherein the document comprises at least two layers, and the at least one layer is prohibited to be modified by another user at the same time; and
wherein, providing at least one layer of the layers for the user to modify comprises: providing visual appearance information of the at least one layer to editing software at user side and presenting the visual appearance of the at least one layer to the user via the editing software wherein, each layer is stored in sequence, and one layer is overlaid with another layer to form a page of the document;
a second module, while instructions are executed by the processor, adapted to receive and store visual appearance information of the layer modified by the user;
wherein the visual appearance is extracted from contents of the document, and describes page layout of the documents.

16. The docbase management system of claim 15, further comprising:
a third module, while instructions are executed by the processor, adapted to perform one or more of:
providing a modified layer to another user opening the modified layer of the document after the second module stores the layer modified by the user;
determining whether a queried layer has been modified when a user terminal of another user queries information of a layer of the document; if the queried layer has been modified, providing the modified layer to the another user;
notifying other users opening a modified layer after the second module stores the layer modified by the user.

17. The docbase management system of claim 15, wherein the first module is adapted to provide at least one layer of a page of the document as the at least one layer for the user to modify, wherein the document comprises at least one page and each page comprises at least two layers.

18. The docbase management system of claim 15, wherein at least one of the first module, the second module and the third module resides in a docbase management system.

* * * * *